United States Patent
Huang et al.

(10) Patent No.: US 9,697,375 B2
(45) Date of Patent: Jul. 4, 2017

(54) FAST DATA PROTECTION USING DUAL FILE SYSTEMS

(71) Applicants: MICROSOFT TECHNOLOGY LICENSING, LLC, Redmond, WA (US); Zhen Liu, Beijing (CN); Jerry Huang, Beijing (CN)

(72) Inventors: Jerry Huang, Redmond, WA (US); Zhen Liu, Tarrytown, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 14/401,062

(22) PCT Filed: Jun. 27, 2014

(86) PCT No.: PCT/CN2014/080935
§ 371 (c)(1),
(2) Date: Nov. 13, 2014

(87) PCT Pub. No.: WO2015/196444
PCT Pub. Date: Dec. 30, 2015

(65) Prior Publication Data
US 2016/0371500 A1    Dec. 22, 2016

(51) Int. Cl.
*G06F 21/62*    (2013.01)
*G06F 21/74*    (2013.01)
(Continued)

(52) U.S. Cl.
CPC ........ *G06F 21/6218* (2013.01); *G06F 21/604* (2013.01); *G06F 21/6245* (2013.01);
(Continued)

(58) Field of Classification Search
None
See application file for complete search history.

(56) References Cited

U.S. PATENT DOCUMENTS 8,468,591 B2   6/2013   Silverstone
8,499,171 B2 *  7/2013   Mauro, II ............... G06F 21/79
                                            713/193
(Continued)

FOREIGN PATENT DOCUMENTS

CN    101026822 A    8/2007
CN    101458666 A    6/2009
(Continued)

OTHER PUBLICATIONS

Yang, et al., "EagleVision: A Pervasive Mobile Device Protection System", In 6th Annual International Mobile and Ubiquitous Systems: Networking & Services, Jul. 16, 2009, 10 pages.

(Continued)

*Primary Examiner* — Trang Doan
(74) *Attorney, Agent, or Firm* — Fiala & Weaver P.L.L.C.

(57) ABSTRACT

A computing device is described that utilizes two file systems to enable sensitive data stored thereon to be deleted automatically, quickly, and discretely when the computing device is in a risky environment or context or when data protection has otherwise been activated. A first file system on the computing device manages a first memory area that stores non-sensitive data while a second file system on the computing device manages a second memory area that stores sensitive data. Only the first file system operates to receive data requests from other processes executing on the computing device. In a first operating mode, the first file system interacts with the second file system to ensure that both non-sensitive and sensitive data is returned in response to data requests. In a second operating mode, communication between the two file systems is disabled and the second file system deletes the sensitive data.

20 Claims, 8 Drawing Sheets

(51) Int. Cl.
*G06F 21/60* (2013.01)
*G06F 21/31* (2013.01)
*G06F 21/50* (2013.01)

(52) U.S. Cl.
CPC .............. *G06F 21/74* (2013.01); *G06F 21/31* (2013.01); *G06F 21/50* (2013.01); *G06F 2221/2107* (2013.01); *G06F 2221/2143* (2013.01)

(56) References Cited

U.S. PATENT DOCUMENTS

| | | | |
|---|---|---|---|
| 8,656,016 B1 | 2/2014 | Bender et al. | |
| 2005/0044338 A1* | 2/2005 | Goss | G06F 21/78 |
| | | | 711/203 |
| 2007/0250920 A1* | 10/2007 | Lindsay | G06F 21/31 |
| | | | 726/7 |
| 2008/0066187 A1 | 3/2008 | Dive-Reclus et al. | |
| 2008/0098172 A1* | 4/2008 | Tsang | G06F 21/554 |
| | | | 711/115 |
| 2010/0005531 A1* | 1/2010 | Largman | G06F 21/53 |
| | | | 726/24 |
| 2010/0180335 A1* | 7/2010 | Smithson | G06F 21/31 |
| | | | 726/18 |
| 2012/0216001 A1* | 8/2012 | Ramly | G06F 21/87 |
| | | | 711/163 |
| 2012/0297202 A1* | 11/2012 | Gallet | G06F 1/3203 |
| | | | 713/189 |
| 2013/0219176 A1* | 8/2013 | Akella | H04L 63/0815 |
| | | | 713/165 |
| 2013/0305354 A1* | 11/2013 | King | G06F 21/31 |
| | | | 726/19 |
| 2014/0006347 A1 | 1/2014 | Qureshi et al. | |

FOREIGN PATENT DOCUMENTS

| | | |
|---|---|---|
| CN | 103034819 A | 4/2013 |
| CN | 103391367 A | 11/2013 |

OTHER PUBLICATIONS

International Search Report and Written Opinion Issued in PCT Patent Application No. PCT/CN2014/080935, Mailed Date: Mar. 30, 2015, 12 Pages.

* cited by examiner

FAST DATA PROTECTION USING DUAL FILE SYSTEMS

This application is a U.S. national phase of International Application No. PCT/CN2014/080935 filed Jun. 27, 2014, which designated the U.S. and is incorporated by reference herein in its entirety.

BACKGROUND

Increasingly more data is being stored on devices, particularly mobile devices. For instance, people may store personal data, and employees may store corporate data, governmental data, client-related data, intellectual property, and/or other sensitive forms of data on their devices. This sensitive data is put at risk when a device is lost, stolen, or compromised in some other manner.

To address this issue, techniques have been developed to protect sensitive data on devices. Conventional device data protection techniques typically rely on some form of user authentication, encryption, or a combination thereof. For example, a user may set up her device to require that a particular password or PIN be entered before data may be accessed on the device. Additionally, some devices enable users to encrypt files or folders stored thereon, which means that a code must be entered before a file can be viewed or copied. While such mechanisms can help protect sensitive data from unauthorized access, they are not foolproof. For example, a password mechanism will not work if the user is forced to give out her password against her will, or if the device is taken away while in active operation (i.e., after the user has already entered her password). Still other means may be used to overcome user authentication and encryption schemes. Once these data protection measures have been overcome, there is typically no way to protect the sensitive data from unauthorized access.

If a user determines that she is in a place where her device is likely to be stolen, she may be able to take active steps to protect the sensitive data. For example, the user may be able to input commands to her device to delete all the sensitive data therefrom. Depending upon the scenario, this may be necessary to protect the user's personal safety as well as the sensitive data. However, in many situations, the user will not be able to anticipate that her device will be stolen and thus will not take such steps. Even in situations where the user can anticipate a device theft, the user may not have sufficient time at her disposal to interact with her device to delete the sensitive data therefrom.

SUMMARY

A computing device is described herein that utilizes two file systems to enable sensitive data stored on the computing device to be hidden or deleted automatically, quickly, and discretely when it is determined that the computing device is in a risky environment or context, has become susceptible or subject to an unauthorized access, or when data protection has otherwise been activated. Associated systems, methods and computer program products are also described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
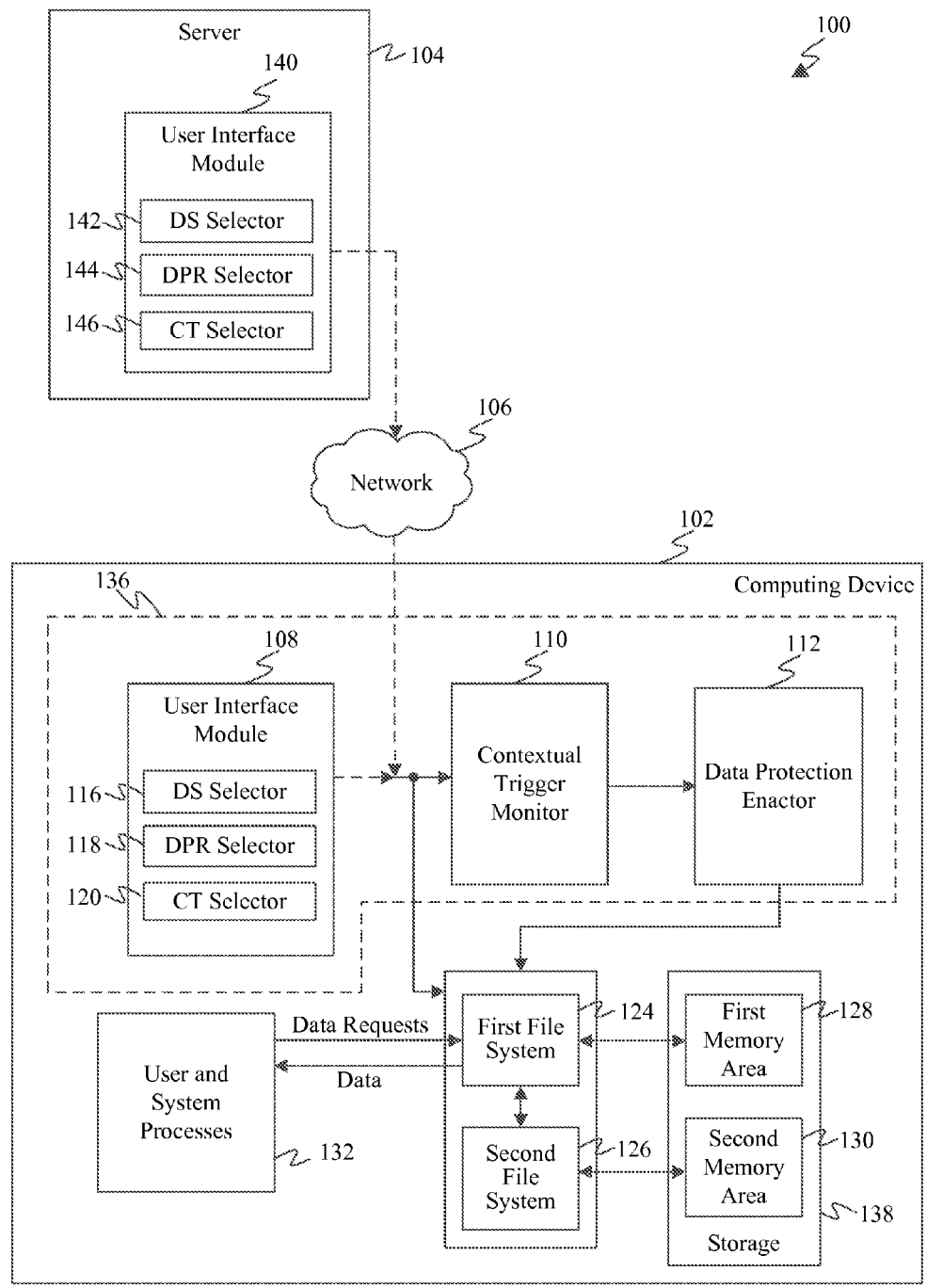
FIG. 1 is a block diagram of an example system that includes a computing device that utilizes two file systems to automatically, quickly, and discretely hide or delete sensitive data stored on the computing device when data protection has been activated.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

A computing device is described herein that utilizes two file systems to enable sensitive data stored on the computing device to be hidden or deleted automatically, quickly, and discretely when it is determined that the computing device is in a risky environment or context, has become susceptible or subject to an unauthorized access, or when data protection has otherwise been activated. In embodiments, a first file system on the computing device manages a first memory area that stores non-sensitive data while a second file system on the computing device manages a second memory area that stores sensitive data. Only the first file system operates to receive data requests from other processes (e.g., user and system processes) executing on the computing device.

During a first operating mode (e.g., an operating mode in which data protection has not been activated), the first file system services a received data request by retrieving any non-sensitive data specified by the data request from the first memory area. The first file system also forwards the data request to the second file system. If there is any sensitive data specified by the data request, then the second file system will retrieve the sensitive data from the second memory area (which may include decrypting the sensitive data in an embodiment in which the sensitive data is encrypted) and return it to the first file system. The first file system then combines any retrieved non-sensitive and sensitive data and returns it to the requesting process. Thus, during the first operating mode, both non-sensitive and sensitive data is accessible to a user of the computing device.

During a second operating mode (e.g., an operating mode in which data protection has been activated), the first file system will service data requests received from other processes by only retrieving any non-sensitive data specified by the data requests from the first memory area. The first file system will not forward data requests to the second file system or, alternatively, the second file system will ignore any data requests forwarded from the first file system. During the second operating mode, the second file system may also automatically delete the sensitive data that is stored in the second memory area. As will be discussed herein, such deletion may comprise a "hard delete" in which the sensitive data is overwritten or otherwise rendered permanently inaccessible, and/or a "soft delete," in which links or pointers to sensitive files are deleted but may later be recovered from secure storage. Thus, during the second operating mode, the sensitive data is automatically rendered inaccessible to a user of the computing device. Since the first file system is still operating to return non-sensitive data, the deletion of the second data can be achieved in a manner that may not be apparent to a user of the computing device, to whom the device still appears to be functioning normally.

In a further embodiment, during the second operating mode, the second file system will not delete at least some of the sensitive data. However, because the first file system does not forward data requests to the second file system or because the second file system ignores any data requests received from the first file system, the sensitive data that is not deleted will nevertheless not be retrieved from storage in response to any data requests received by the first file system. Thus, in accordance with this embodiment, sensitive data may be hidden but not deleted.

In embodiments, data of differing sensitivity levels is stored in different memory areas, such as different disks, partitions, or the like. For example, as mentioned above, non-sensitive data may be stored in a first memory area and sensitive data may be stored in a second memory area. Furthermore, sensitive data may be classified into different categories (e.g., based on degree of sensitivity or manner of deletion) and separately stored in corresponding memory areas. Within a given memory area, data of like sensitivity level may be grouped together in close proximity to facilitate fast deletion thereof. For example, where the memory area is implemented on a hard disk drive, data of like sensitivity levels may be stored in close proximity on the hard disk tracks. Furthermore, the second file system that manages the sensitive data may intermittently (e.g., periodically) perform a defragmentation operation on groups of sensitive data to ensure that such data is stored in as few contiguous regions as possible to facilitate fast deletion when data protection is activated.

The foregoing features enable the computing device to automatically, quickly and discretely hide or delete sensitive data that is stored by the computing device when data protection is activated. Such data protection may be activated, for example, when a contextual trigger is detected by the computing device. Such contextual trigger may indicate, for example, that the computing device is in a risky environment or has become susceptible or subject to an unauthorized access. By automatically, quickly and discretely hiding or deleting sensitive data in such situations, embodiments described herein can effectively protect sensitive data stored on the computing device as well as the personal safety of the user or owner of the device.

Section II describes an example data protection environment that includes a computing device that utilizes two file systems to automatically, quickly, and discretely hide or delete sensitive data stored on the computing device when data protection is activated. Section III describes exemplary methods of operation of the computing device. Section IV describes an example mobile device implementation of the computing device. Section V describes an example desktop computer implementation of the computing device. Section VI describes some additional exemplary embodiments. Section VII provides some concluding remarks.

II. Example Computing Device that Provides Fast Data Protection Using Dual File Systems FIG. 1 is a block diagram of a data protection environment 100 that includes a computing device 102 that utilizes dual file systems to automatically, quickly, and discretely hide or delete sensitive data stored on computing device 102 when data protection is activated. As shown in FIG. 1, data protection environment 100 includes computing device 102 and a server 104 that is communicatively coupled thereto by a network 106. Computing device 102 includes a data protection management component 136, user and system processes 132, a first file system 124, a second file system 126, and storage 138. Data protection management component 136 includes a user interface module 108, a contextual trigger monitor 110, and a data protection enactor 112. Furthermore, server 104 includes a user interface module 140. The features of environment 100 are described as follows.

As shown in FIG. 1, data protection management component 136 is implemented in computing device 102. In another embodiment, data protection management component 136 may be implemented partially in computing device 102 and partially in server 104. For instance, user interface module 108, contextual trigger monitor 110, and data protection enactor 112 may be included in computing device 102. Alternatively, user interface module 108 may not be present in computing device 102, but instead, user interface module 140 of server 104 may be part of data protection system 136 along with contextual trigger monitor 110 and data protection enactor 112. In another embodiment, both of user interface modules 108 and 140 may be present and part of data protection management component 136.

Computing device 102 may be any type of stationary or mobile computing device, including a mobile computer (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a wearable computing device (e.g., a smart watch, a head-mounted device including smart glasses such as Google® Glass™, etc.), a digital camera, or other type of mobile device, or a stationary computing device such as a desktop computer or PC (personal computer).

Storage 138 may include one or more of any type of storage medium/device to store data, including a magnetic disc (e.g., in a hard disk drive), a solid state drive, an optical disc (e.g., in an optical disk drive), a magnetic tape (e.g., in a tape drive), a memory device such as a RAM device, a ROM device, etc., and/or any other suitable type of storage medium/device. Storage 138 includes a first memory area 128 that is managed by first file system 124 and a second memory area 130 that is managed by second file system 126. First memory area 128 is used to store non-sensitive data while second memory area 130 is used to store sensitive data. In an embodiment, first memory area 128 and second memory area 130 comprise different disks. In another embodiment, first memory area and second memory area 130 comprise different partitions implemented on the same hard disk drive. However, these examples are not intended to be limiting, and persons skilled in the relevant art(s) will appreciate that first memory area 128 and second memory area 130 can be implemented as any physically and/or logically distinct areas of memory using any suitable type of memory technology.

Network 106 may comprise a local area network (LAN), a wide area network (WAN), a personal area network (PAN), and/or a combination of communication networks, such as the Internet. For communications over network 106, computing device 102 and server 104 may each include a network interface (e.g., a network interface card (NIC), etc.), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, etc.

User interface module 108 at computing device 102 may be present as a convenient way for a user of computing device 102 to configure protection for data stored in computing device 102. User interface module 108 may be part of a data protection application stored in computing device 102 (e.g., a standalone desktop or mobile application, an "app" that is partially cloud-based, etc.), may be part of an OS of computing device 102, or may be present and configured in computing device 102 in another manner.

In another embodiment, it may be desired to not have user interface module 108 in computing device 102. For instance, it may be determined to be a security weakness if any person who obtains and is able to log into computing device 102 has access to user interface module 108, and therefore can configure (including remove) protections for data stored at computing device 102. In such an embodiment, user interface module 108 may not be present at computing device 102, and instead, user interface module 140 may be present at server 104 to be used to configure protection for data stored in computing device 102. For example, user interface module 140 may be part of a data protection application (or an OS) stored in server 104 that is not network accessible, may be part of a network accessible application (e.g., a browser accessible application), or may be present and configured in server 104 in another manner.

A user may interact with user interface module 108 (when present) at computing device 102, or may interact with user interface module 140 (when present) at server 104, to configure data protection for data stored by computing device 102. The user that configures the data protection may be an owner or other user of computing device 102, a system administrator (e.g., when computing device 102 is a device of an enterprise), or other person.

For example, a user may interact with a data sensitivity (DS) selector 116 provided by user interface module 108 or a DS selector 142 provided by user interface module 140 to select a sensitivity level for selected data, such as for one or more selected files or folders. For example, a user may interact with DS selector 116 or DS selector 142 to designate selected data as either sensitive or non-sensitive. In an embodiment, a user may also interact with DS selector 116 or DS selector 142 to designate selected data as having differing degrees of sensitivity (e.g., moderately sensitive or highly sensitive). In response to this designation, first file system 124 and second file system 126 will operate to ensure that any data designated as non-sensitive will be stored in first memory area 128 while any data that is designated as sensitive will be stored in second memory area 130. As noted above, data stored in first memory area 128 is managed by first file system 124 and data stored in second memory area 130 is managed by second file system 126.

A user may also interact with a data protection response (DPR) selector 118 provided by user interface module 108 or a DPR selector 144 provided by user interface module 140 to select a data protection response for selected sensitive data, such as for one or more selected sensitive files or folders. The data protection response is the action to be taken upon the selected sensitive data by second file system 126 should a data protection mode be activated by data protection enactor 112. For example, the data protection response may comprise hard deleting the selected sensitive data or soft deleting the selected sensitive data. As will be discussed in more detail herein, hard deletion comprises rendering data permanently inaccessible while soft deletion comprises rendering data temporarily inaccessible such that it may be recovered at a subsequent time. As another example, the data protection response may comprise hiding but not deleting the selected sensitive data. The data protection response associated with a particular item of sensitive data may be explicitly associated with such data (e.g., by being stored as part of metadata associated with the data) or implicitly associated with such data (e.g., by storing the data in a memory area for files designated for soft deletion, in a memory area for file designated for hard deletion, or in a memory area for files designated for hiding). Other data protection responses may include, for example, generating an alert when the sensitive data is accessed, disabling a sensitive file from being opened, or closing an opened window that displays the sensitive data.

A user may further interact with a contextual trigger (CT) selector 120 provided by user interface module 108 or a CT selector 146 provided by user interface module 140 to set a contextual trigger the detection of which will cause a data protection mode to be activated by data protection enactor 112. The contextual trigger may be a condition or set of conditions that, when detected, indicate that computing device 102 is in a risky environment or has become subject or susceptible to an unauthorized access. Examples of contextual triggers include but are not limited to: computing device 102 being or not being in a particular location, or heading toward or away from a certain location; sensed biometric information associated with an authorized user of computing device 102 indicating that the authorized user is in distress; sensing that unauthorized users are in close proximity to computing device 102; tampering with computing device 102; failure of a user to provide required input during device boot-up, login, or shut down; and sensed behaviors of a user of computing device 102 indicating that the user is not an authorized user. A wide variety of other contextual triggers may be used as well.

Computing device 102 may operate in both a "normal" operating mode where both non-sensitive and sensitive data are accessible to the user and a "data protection" mode where only non-sensitive data is accessible to the user and sensitive data is automatically and discretely hidden or deleted. Once one or more contextual triggers have been set up by a user via CT selector 120 or CT selector 146, contextual trigger monitor 110 operates over time to determine if any of the contextual trigger(s) have been detected. If contextual trigger monitor 110 determines that a contextual trigger has been detected, then contextual trigger monitor 110 notifies data protection enactor 112. In response to this notification, data protection enactor 112 may cause computing device 112 to leave the normal operating mode and enter the data protection mode.

In computing device 102, first file system 124 is configured to handle all data requests received from various user and system processes 132 concurrently executing on computing device 102. As will be discussed below, when computing device 102 is operating in the normal mode, first file system 124 and second file system 126 work together to retrieve any non-sensitive data required to fulfill a data request from first memory area 128 and any sensitive data required to fulfill the data request from second memory area 130. However, when computing device 102 is operating in the data protection mode, first file system 124 will only fulfill data requests by obtaining non-sensitive data from first memory area 128 and requests for sensitive data will essentially be ignored. Furthermore, in the data protection mode, second file system 126 may operate to quickly and automatically delete some or all of the sensitive data stored in second memory area 130.

Further details concerning the manner in which computing device 102 uses first file system 124 and second file system 126 to separately store non-sensitive data and sensitive data and to quickly protect sensitive data when a data protection mode is activated will be provided in the following section.

Figure 2:
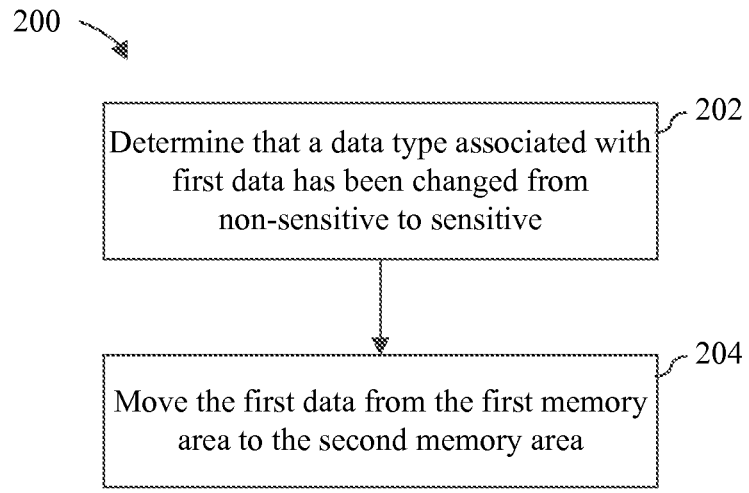
FIG. 2 is a flowchart of a method for grouping sensitive data in a memory area managed by a second of two file systems of a computing device in accordance with an embodiment.

III. Example Methods of Operation of a Computing Device that Provides Fast Data Protection Using Dual File Systems Further details concerning the manner of operation of computing device 102 will now be provided in reference to FIGS. 2-10. In particular, FIG. 2 depicts a flowchart 200 of a method for grouping sensitive data in a memory area managed by a second of two file systems of a computing device in accordance with an embodiment. The method of flowchart 200 may be performed, for example, by data protection management component 136, first file system 124, and second file system 126 of computing device 102 as discussed above in reference to FIG. 1. Accordingly, the method of flowchart 200 will now be described with continued reference to such components of FIG. 1. However, the method is not limited to that implementation.

As shown in FIG. 2, the method of flowchart 200 begins at step 202 in which data protection management component 136 determines that a data type associated with first data has been changed from non-sensitive to sensitive. The first data may comprise, for example, one or more files or folders. This step may occur, for example, when a user interacts with DS selector 116 or DS selector 142 to change a sensitivity level associated with one or more selected files or folders from non-sensitive to sensitive.

At step 204, the first data is moved from first memory area 128 to second memory area 130 in response to the data type being changed from sensitive to non-sensitive. This step may be carried out by first file system 124 and second file system 126 in response to information received from DS selector 116 or DS selector 142. For example, in response to information received from DS selector 116 or DS selector 142 indicating that the sensitivity level associated with the first data has been changed from non-sensitive to sensitive, first file system 124 may retrieve a copy of the first data from first memory area 128 and provide the copy of the first data to second file system 126 and second file system 126 may store the copy of the first data in second memory area 130. First file system 124 may then delete the first data from first memory area 128. In an embodiment, second file system 126 may encrypt the copy of the first data before storing it to second memory area 130.

This process has the beneficial effect of storing all the sensitive data together within second memory area 130, where it can be managed exclusively by second file system 126. Such management may include automatic deletion of the sensitive data when a data protection mode is activated by data protection enactor 112. In an embodiment, when second file system 126 stores sensitive data in second memory area 130, it stores such data in close proximity to facilitate fast deletion thereof. For example, in an embodiment in which second memory area 130 is implemented on a hard disk drive, second file system 126 may store sensitive data in close proximity on the hard disk tracks. In a further embodiment in which second memory area 130 is implemented on a hard disk drive, second file system 126 may be configured to intermittently perform a defragmentation operation on the sensitive data stored in second memory area 130 to ensure that such data is stored in as few contiguous regions as possible to facilitate fast deletion when data protection is activated by data protection enactor 112. Such defragmentation may be performed, for example, on a periodic basis, at certain predefined times, or in response to certain events (e.g., a determination that a measure of fragmentation associated with second memory area 130 has reached or exceeded a particular threshold).

In a further embodiment, data sensitivity level selector 116 and/or data sensitivity level selector 142 may enable a user to assign different levels of sensitivity to sensitive data, such as moderately sensitive and highly sensitive. In accordance with such an embodiment, second file system 126 may separately store such different categories of sensitive data in corresponding memory areas. Then, when data protection is activated, second file system 126 can prioritize its deletion operations such that data having a relatively higher sensitivity level will be deleted before data having a relatively lower sensitivity level. Second file system 126 may also group sensitive data based on the data protection response that is assigned thereto via DPR selector 118 and/or DPR selector 144. For example, second file system 126 may store sensitive data that is to be hard deleted separately from sensitive data that is to be soft deleted to facilitate more efficient deletion thereof. As another example, second file system 126 may store sensitive data that is to be deleted separately from sensitive data that is to be hidden.

Figure 3:
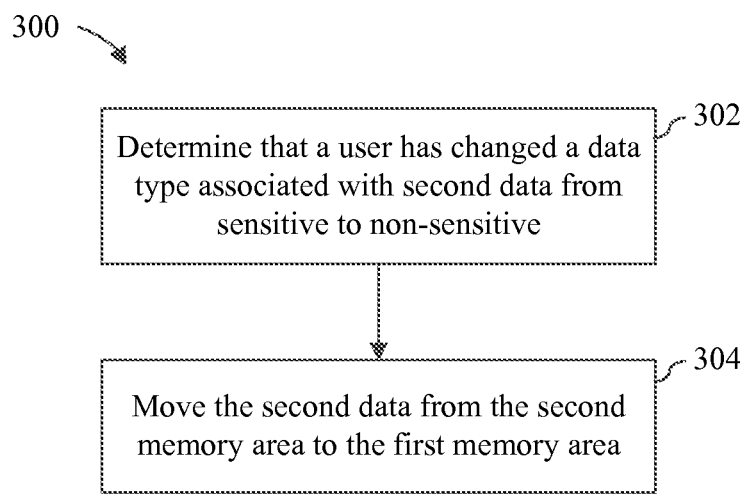
FIG. 3 is a flowchart of a method for grouping non-sensitive data in a memory area managed by a first of two file systems of a computing device in accordance with an embodiment.

FIG. 3 further illustrates how computing device 102 may operate to group data of like sensitivity in the same memory area. In particular, FIG. 3 is a flowchart 300 of a method for grouping non-sensitive data in a memory area managed by a first of two file systems of a computing device in accordance with an embodiment. The method of flowchart 300 may be performed, for example, by data protection management component 136, first file system 124, and second file system 126 of computing device 102 as discussed above in reference to FIG. 1. Accordingly, the method of flowchart 300 will now be described with continued reference to such components of FIG. 1. However, the method is not limited to that implementation.

As shown in FIG. 3, the method of flowchart 300 begins at step 302 in which data protection management component 136 determines that a data type associated with second data has been changed from sensitive to non-sensitive. The second data may comprise, for example, one or more files or folders. This step may occur, for example, when a user interacts with DS selector 116 or DS selector 142 to change a sensitivity level associated with one or more selected files or folders from sensitive to non-sensitive.

At step 304, the second data is moved from second memory area 130 to first memory area 128 in response to the data type being changed from non-sensitive to sensitive. This step may be carried out by first file system 124 and second file system 126 in response to information received from DS selector 116 or DS selector 142. For example, in response to information received from DS selector 116 or DS selector 142 indicating that the sensitivity level associated with the second data has been changed from sensitive to non-sensitive, second file system 126 may retrieve a copy of the second data from second memory area 130 and provide the copy of the second data to first file system 124 and first file system 124 may store the copy of the second data in first memory area 128. Second file system 126 may then delete the second data from second memory area 130. In an embodiment, second file system 126 may decrypt the copy of the second data before providing it to first file system 124. This process has the beneficial effect of storing all the non-sensitive data together within first memory area 128, where it can be managed exclusively by first file system 128.

In the foregoing methods of flowcharts 200 and 300, data was either moved from first memory area 128 to second memory area 130 or vice versa based on a detected change of sensitivity level associated with the data. However, sensitivity levels may also be assigned to a file or folder before the file or folder has ever been saved to storage 138. In such a case, data that is initially designated as non-sensitive will be stored in first memory area 128 by first file system 124 and data that is initially designated as sensitive will initially be stored in second memory area 130. In one embodiment, data for which no sensitivity level designation has been provided by a user will be assumed to be non-sensitive and stored in first memory area 128 by first file system 124.

Figure 4:
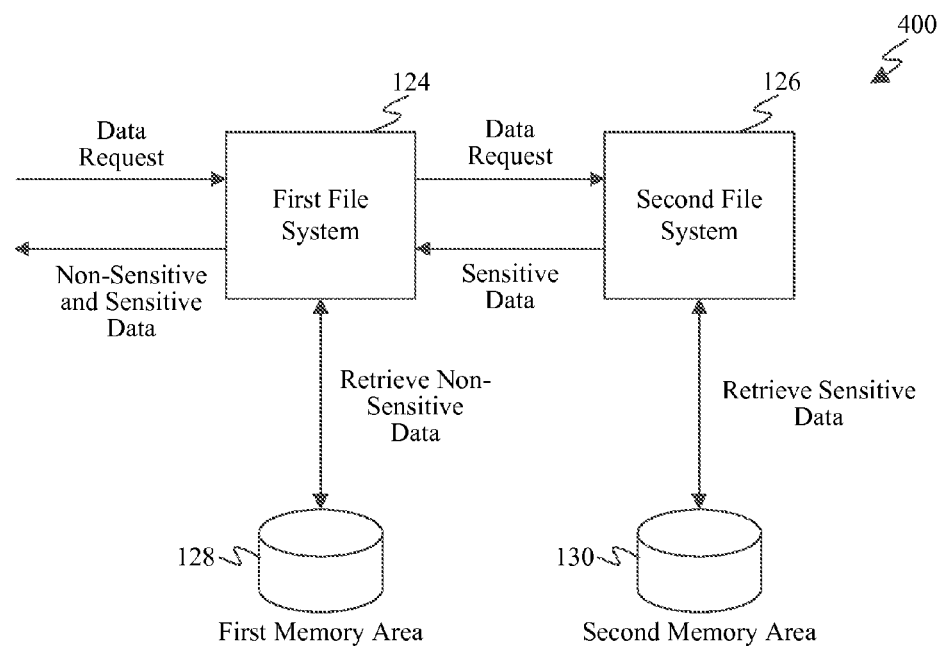
FIG. 4 is a block diagram illustrating how dual file systems are used to process data requests in a first operating mode of a computing device, the first operating mode being a mode where data protection has not been activated.

FIG. 4 is a block diagram 400 that illustrates how first file system 124 and second file system 126 may be used to process data requests in a first operating mode of computing device 102, the first operating mode being a mode where data protection has not been activated by data protection enactor 112.

As shown in FIG. 4, the process begins with first file system 124 receiving a data request. Such data request may be received from another process executing on computing device 102, such as one of user and system processes 132. Such data request may request or specify that certain data (e.g., one or more files or folders) be returned, wherein such data may include one or more of non-sensitive data and sensitive data. If non-sensitive data is specified by the data request, then first file system 124 retrieves such non-sensitive data from first memory area 128 as shown in FIG. 4.

As also shown in FIG. 4, first file system 124 forwards the data request to second file system 126. In response to receiving the data request, second file system 126 determines whether the data request specifies any sensitive data (i.e., whether sensitive data must be returned to fulfill the data request). If sensitive data is specified by the data request, then second file system 126 retrieves the sensitive data from second memory area 130 and then returns the retrieved sensitive data to first file system 124. Retrieving the sensitive data from second memory area 130 may comprise decrypting the sensitive data if the sensitive data was stored in an encrypted form.

First file system 124 then combines any non-sensitive data specified by the data request that was retrieved from first memory area 128 with any sensitive data specified by the data request and obtained from second file system 126 and returns the resulting data to the process that sent the originally data request as further shown in FIG. 4.

In the embodiment illustrated in FIG. 4, first file system 124 forwards a copy of the original data request to second file system 126. However, alternative approaches may be used. For example, first file system 124 may only forward the data request to second file system 126 if first file system 124 determines that the data request specifies data that first file system 124 cannot itself retrieve from first memory area 128, such as sensitive data that is stored in second memory area 130. Furthermore, the data request that is sent from first file system 124 to second file system 126 may not be the same data request that was originally received by first file system 124. For example, file system 124 may create a second data request to send to second file system 124 that is different in form and/or substance than the original data request.

Figure 5:
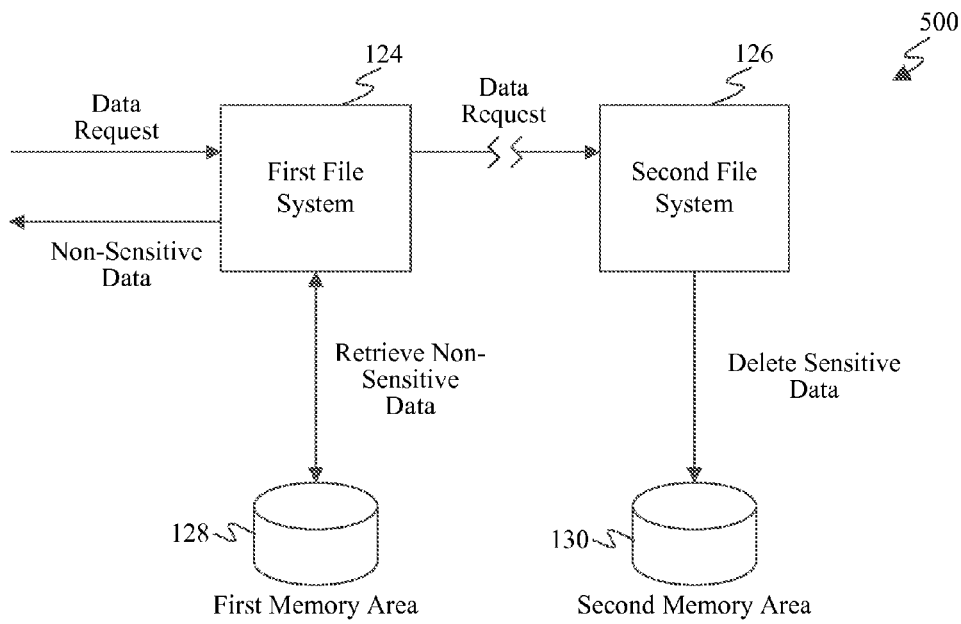
FIG. 5 is a block diagram illustrating how dual file systems are used to process data requests and delete sensitive data in a second operating mode of a computing device, the second operating mode being a mode where data protection has been activated.

FIG. 5 is a block diagram 500 that illustrates how first file system 124 and second file system 126 are used to process data requests and delete sensitive data in a second operating mode of computing device 102, the second operating mode being a mode where data protection has been activated by data protection enactor 112.

As shown in FIG. 5, the process begins with first file system 124 receiving a data request. Such data request may be received from another process executing on computing device 102, such as one of user and system processes 132. Such data request may request or specify that certain data (e.g., one or more files or folders) be returned, wherein such data may include one or more of non-sensitive data and sensitive data. If non-sensitive data is specified by the data request, then first file system 124 retrieves such non-sensitive data from first memory area 128 and returns the non-sensitive data to the process that sent the data request as shown in FIG. 5.

As also shown in FIG. 5, communication between first file system 124 and second file system 126 has been disabled in the second operating mode. This may be achieved, for example, by programming second file system 126 to ignore any data requests received from first file system 124 during the second operating mode. This may also be achieved, for example, by programming first file system 124 not to send any data requests to second file system 126 during the second operating mode. Still other techniques may be used to disable the communication of data requests between first file system 124 and second file system 126 during the second operating mode. As a result of disabling this communication, first file system 124 cannot possibly return sensitive data in response to data requests during the second operating mode.

As also shown in FIG. 5, second file system 126 operates to delete the sensitive data that is stored in second memory area 130 during the second operating mode. For example, second file system 126 may be programmed to delete the sensitive data that is stored in second memory area 130 as soon as possible after activation of the second operating mode by data protection enactor 112. As noted above, in an embodiment in which sensitive data may be assigned different sensitivity levels, second file system 126 may operate to delete higher sensitivity data before lower sensitivity data.

As was also previously discussed, DPR selector 118 or DPR selector 144 may be used to assign a data protection response of "hard delete" to sensitive data that is stored in second memory area 130. In the case where sensitive data has been designated for hard deletion, second file system 126 will delete the sensitive data in a manner that ensures that the sensitive data or a substantial portion thereof will be rendered permanently inaccessible. For example, in an embodiment in which second memory area 130 is implemented on a hard disk drive, second file system 126 may hard delete the sensitive data by overwriting all of the sectors that are being used to store the sensitive data or by randomly overwriting a certain number of those sectors. In an embodiment in which second memory area 130 is implemented on a solid state drive, second file system 126 may hard delete the sensitive data by using a secure deletion utility (e.g., a secure deletion utility provided by the solid state drive manufacturer) to permanently erase the sensitive data therefrom.

DPR selector 118 or DPR selector 144 may be used to assign a data protection response of "soft delete" to sensitive data that is stored in second memory area 130. In the case where sensitive data has been designated for soft deletion, second file system 126 will delete the sensitive data in a manner that renders the sensitive data temporarily inaccessible but potentially capable of recovery at a later time. For example, in an embodiment, second file system 126 may soft delete one or more sensitive files by deleting one or more links or file pointers used by second file system 126 to manager interaction with the one or more sensitive files. However, the data content of such files may persist, at least for a time, in second memory area 130 although such data will not be accessible to any file system on computing device 102.

Before deleting the links or file pointers, however, second file system 126 may store a copy of the file pointers to a secure location. For example second file system 126 may create an encrypted file that includes a backup copy of the deleted links or file pointers and store such encrypted file in a hidden volume or other secure location within storage 138. In another embodiment, second file system 126 may cause the backup copy to be transmitted to another device entirely (e.g., via one or more networks) for remote storage thereon. Since the backup copy is saved, a recovery operation can later be executed on computing device 102 in response to which the backup copy can be accessed and decrypted and the links or file pointers can be restored to second file system 126. Second file system 126 can then use the restored links or file pointers to access the sensitive data that was previously soft deleted, provided that such data was not overwritten or rendered inaccessible in some other way in the meantime.

In an alternate embodiment, rather than creating a backup copy of the links or file pointers only prior to deleting them during the second operating mode, second file system 126 may cause backup copies of the links or file pointers used thereby to be stored on an ongoing basis. For example, any time there is a change to one or more of the files stored in second memory area 130, second file system 126 may cause a backup copy of the links or file pointers associated with such files to be stored to a secure location, which may be on computing device 102, server 104, or some other remote entity to which computing device 102 may be communicatively connected. This approach can be used to avoid having to create a backup copy of the links or file pointers immediately prior to deleting them as part of a soft delete operation, thus allowing the sensitive data to be protected more quickly.

In a further embodiment, DPR selector 118 or DPR selector 144 may be used to assign a data protection response of "hide" to sensitive data that is stored in second memory area 130. In the case where sensitive data has been designated for hiding, second file system 126 will not hard delete or soft delete the sensitive data. However, by virtue of the disabling of communication between first file system 124 and second file system 126 during the second operating mode (as discussed above), such sensitive data will not be returned in response to any data requests received by first file system 124. Thus, such sensitive data will effectively be hidden during the second operating mode.

Figure 6:
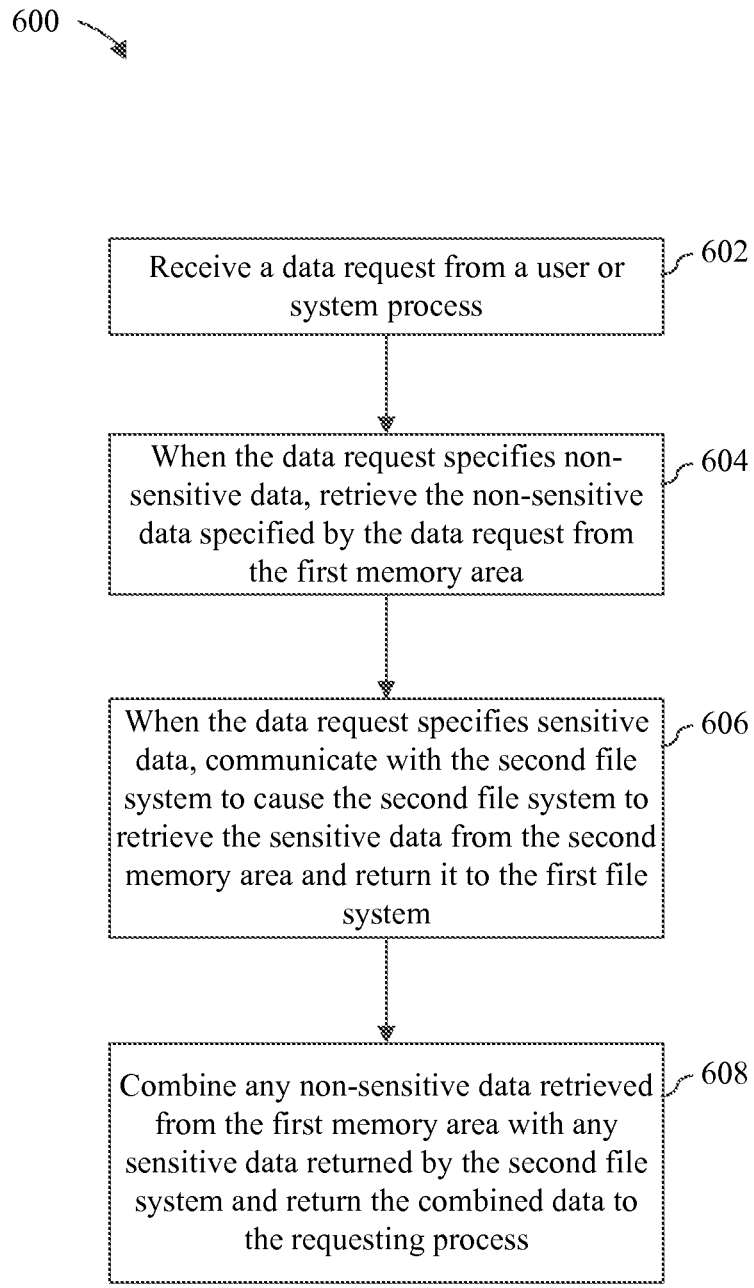
FIG. 6 is a flowchart of a method by which a first of two file systems of a computing device operates to process a data request in a first operating mode of the computing device, the first operating mode being a mode where data protection has not been activated.

The operations that may be performed by first file system 124 and second file system 126 will now be further described in reference to FIGS. 6-10. In particular, FIG. 6 depicts a flowchart 600 of a method by which a first of two file systems of a computing device operates to process a data request in a first operating mode of the computing device, the first operating mode being a mode where data protection has not been activated. The method of flowchart 600 may be performed, for example, by first file system 124 of computing device 102 and thus the method will be described with continued reference to the embodiment shown in FIG. 1. However, the method is not limited to that embodiment.

As shown in FIG. 6, the method of flowchart 600 begins at step 602, in which first file system 124 receives a data request from another process. The other process may be, for example, one of user or system processes 132.

At shown at step 604, when the data request specifies non-sensitive data, first file system 124 retrieves the non-sensitive data specified by the data request from first memory area 128.

As shown at step 606, when the data request specifies sensitive data, first file system 124 communicates with second file system 126 (e.g., forwards the original data request or some other data request to second file system 126) to cause second file system 126 to retrieve the sensitive data specified by the data request from second memory area 130 and to return the retrieved data to first file system 124.

At step 608, first file system 124 combines any non-sensitive data retrieved from first memory area 128 during step 604 and any sensitive data returned by second file system 126 as a result of any communication that occurred during step 606 and returns the combined data to the process from which the data request was received during step 602.

Figure 7:
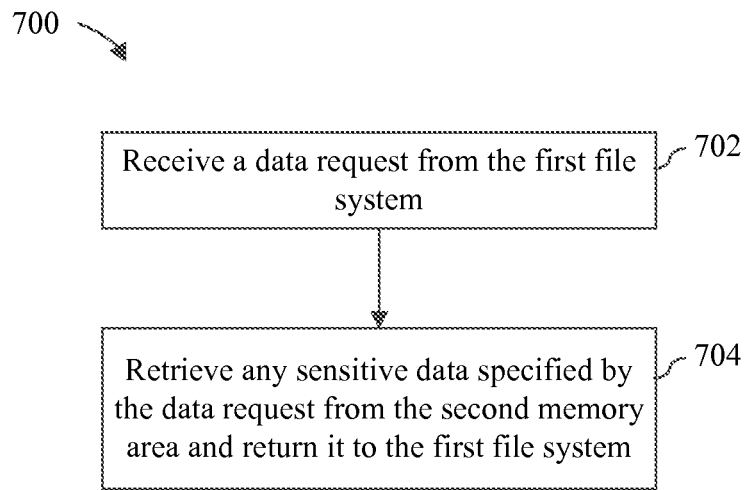
FIG. 7 is a flowchart of a method by which a second of two file systems of a computing device operates to process a data request in a first operating mode of the computing device, the first operating mode being a mode where data protection has not been activated.

FIG. 7 is a flowchart of a method by which a second of two file systems of a computing device operates to process a data request in a first operating mode of the computing device, the first operating mode being a mode where data protection has not been activated. The method of flowchart 700 may be performed, for example, by second file system 126 of computing device 102 and thus the method will be described with continued reference to the embodiment shown in FIG. 1. However, the method is not limited to that embodiment.

As shown in FIG. 7, the method of flowchart 700 begins at step 702 in which second file system 126 receives a data request from first file system 124. The data request may be a forwarded copy of a data request that was received by first file system 124 from another process or may be a data request generated by first file system 124.

At step 704, second file system 126 retrieves any sensitive data specified by the data request received during step 702 from second memory area 130 and returns it to first file system 124. If the sensitive data is stored in encrypted form in second memory area 130 then this step may include decrypting the sensitive data by second file system 126 before returning it to first file system 124.

Figure 8:
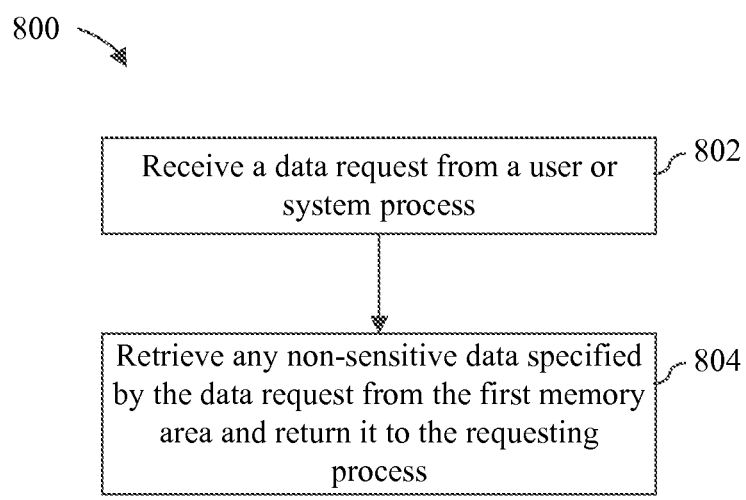
FIG. 8 is a flowchart of a method by which a first of two file systems of a computing device operates to process a data request in a second operating mode of the computing device, the second operating mode being a mode where data protection has been activated.

FIG. 8 is a flowchart of a method by which a first of two file systems of a computing device operates to process a data request in a second operating mode of the computing device, the second operating mode being a mode where data protection has been activated. The method of flowchart 800 may be performed, for example, by first file system 124 of computing device 102 and thus the method will be described with continued reference to the embodiment shown in FIG. 1. However, the method is not limited to that embodiment.

As shown in FIG. 8, the method of flowchart 800 begins at step 802 in which first file system 124 receives a data request from another process. The other process may be, for example, one of user or system processes 132.

At step 804, first file system 124 retrieves any non-sensitive data specified by the data request from first memory area 128 and returns it to the requesting process. In one embodiment, during the second operating mode, even if the data request specifies sensitive data, first file system 124 will not forward the data request or send any other data request to second file system 124 to obtain the sensitive data. In another embodiment, first file system 124 will forward or send such a data request to second file system 124 during the second operating mode, but second file system 124 will ignore the request. Consequently, the sensitive data specified by the request will not be returned.

Figure 9:
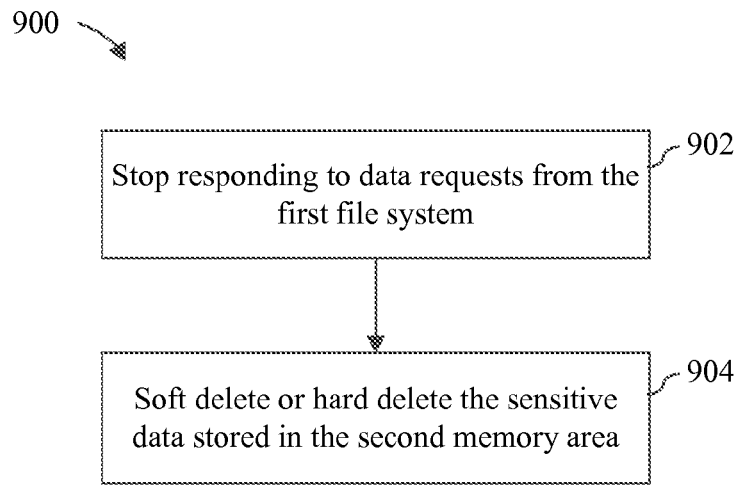
FIG. 9 is a flowchart of a method by which a second of two file systems of a computing device operates to ignore data requests and delete sensitive data in a second operating mode of the computing device, the second operating mode being a mode where data protection has been activated.

FIG. 9 is a flowchart 900 of a method by which a second of two file systems of a computing device operates to ignore data requests and delete sensitive data in a second operating mode of the computing device, the second operating mode being a mode where data protection has been activated. The method of flowchart 900 may be performed, for example, by second file system 126 of computing device 102 and thus the method will be described with continued reference to the embodiment shown in FIG. 1. However, the method is not limited to that embodiment.

As shown in FIG. 9, the method of flowchart 900 begins at step 902 in which second file system 126 stops responding to data requests sent thereto by first file system 124. This step ensures that second file system 124 will not return sensitive data to first file system 124, and that, in turn, first file system 124 will not provide sensitive data in response to data requests received thereby during the second operating mode. As was previously noted, other mechanisms may be used to disable the flow of data requests from first file system 124 to second file system 126, including programming first file system 124 to not send data requests to second file system 126 during the second operating mode.

At step 904, second file system 126 soft deletes or hard deletes the sensitive data stored in second memory area 130. As was previously discussed, hard deletion involves rendering the sensitive data permanently inaccessible while soft deletion involves rendering data temporarily inaccessible such that it may be recovered at a later time. In one embodiment, second file system 126 is configured to hard delete all the sensitive data stored in second memory area 130. In another embodiment, second file system 126 is configured to soft delete all the sensitive data stored in second memory area 130. In yet another embodiment, second file system 126 will selectively hard delete or soft delete items of sensitive data (e.g., files or folders of sensitive data) based upon a data protection response that has been assigned thereto, such as by DPR selector 118 or DPR selector 144. Such data protection response may be explicitly associated with the data (e.g., by being stored as security properties metadata associated with the data) or may be implicitly associated therewith (e.g., by being stored in a memory area dedicated to sensitive data designated for soft deletion or in a memory area dedicated to sensitive data designated for hard deletion).

In a further embodiment, second file system 124 is configured to hide at least some of the sensitive data stored in second memory area 130. When sensitive data is to be hidden, second file system 126 does not hard delete or soft delete it. However, the disruption of communication between first file system 124 and second file system 126 will ensure that the sensitive data is not provided in response to any data requests received by first file system 124.

Figure 10:
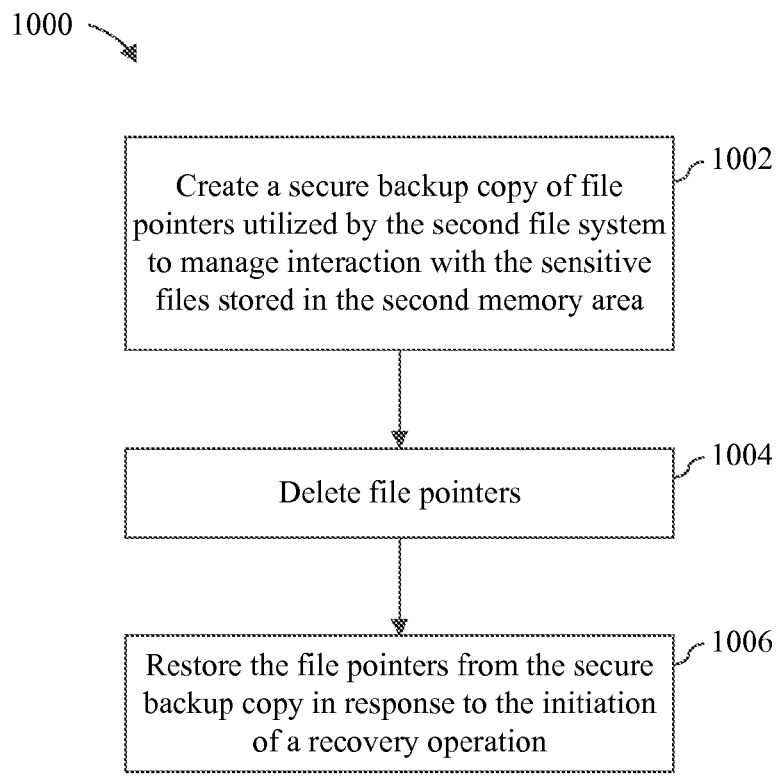
FIG. 10 is a flowchart of a method by which a second of two file systems of a computing device operates to soft delete sensitive data in a second operating mode of the computing device, the second operating mode being a mode where data protection has been activated, and to subsequently recover the soft-deleted data.

FIG. 10 is a flowchart 1000 of a method by which a second of two file systems of a computing device operates to soft delete sensitive data in a second operating mode of the computing device, the second operating mode being a mode where data protection has been activated, and to subsequently recover the soft-deleted data. The method of flowchart 1000 may be performed, for example, by second file system 126 of computing device 102 and thus the method will be described with continued reference to the embodiment shown in FIG. 1. However, the method is not limited to that embodiment.

As shown in FIG. 10, the method of flowchart 1000 begins at step 1002, in which second file system 126 creates a secure backup copy of links or file pointers that are utilized by second file system 126 to manage interaction with the sensitive files stored in second memory area 130. For example second file system 126 may create an encrypted file that includes a backup copy of the links or file pointers and store such encrypted file in a hidden volume or other secure location within storage 138. In another embodiment, second file system 126 may cause the backup copy to be transmitted to another device entirely (e.g., via one or more networks) for remote storage thereon.

At step 1004, second file system 126 deletes the links or file pointers. However, the data content of the files associated with such links or file pointers may persist, at least for a time, in second memory area 130 although such data will not be accessible to any file system on computing device 102.

At step 1006, second file system 126 restores the links or file pointers from the secure backup copy in response to the initiation of a recovery operation. In an embodiment, second file system 126 performs this step by accessing the backup copy, decrypting the links or file pointers stored therein (if they are encrypted), and restoring such links or file pointers to a state in which they can be used by second file system 126 to access the sensitive files stored in second memory area 130. Second file system 126 can then use the restored links or file pointers to access the sensitive data that was previously soft deleted, provided that such data was not overwritten or rendered inaccessible in some other way in the meantime.

IV. Example Mobile Device Implementation

Figure 11:
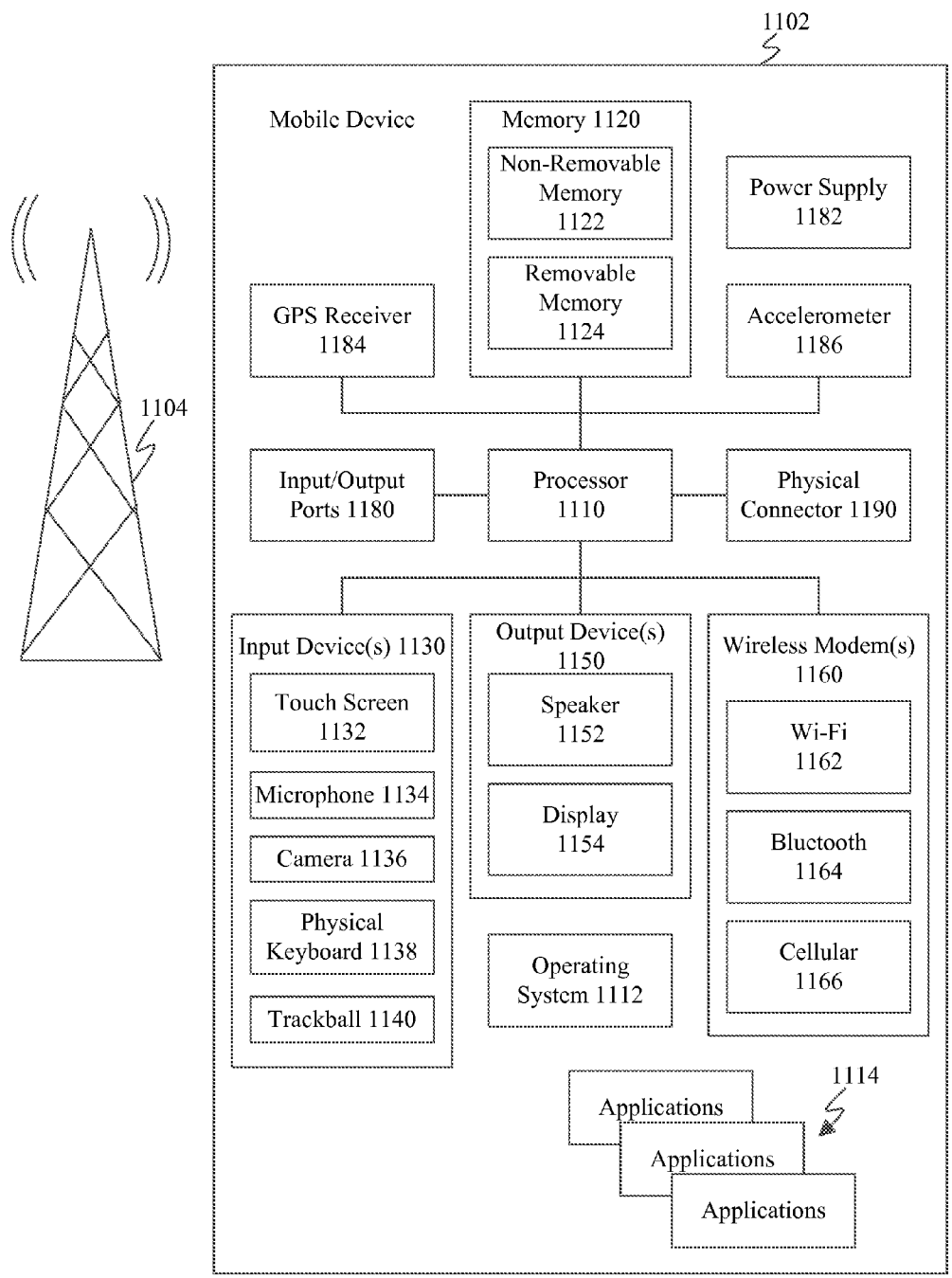
FIG. 11 is a block diagram of an example mobile device that may be used to implement various embodiments described herein.

FIG. 11 is a block diagram of an exemplary mobile device 1102 that may be used to implement end user computing device 102 as described above in reference to FIG. 1. As shown in FIG. 11, mobile device 1102 includes a variety of optional hardware and software components. Any component in mobile device 1102 can communicate with any other component, although not all connections are shown for ease of illustration. Mobile device 1102 can be any of a variety of computing devices (e.g., cell phone, smartphone, handheld computer, Personal Digital Assistant (PDA), etc.) and can allow wireless two-way communications with one or more mobile communications networks 1104, such as a cellular or satellite network, or with a local area or wide area network.

The illustrated mobile device 1102 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components of mobile device 1102 and support for one or more application programs 1114 (also referred to as "applications" or "apps"). Application programs 1114 may include common mobile computing applications (e.g., e-mail, calendar, contacts, Web browser, and messaging applications) and any other computing applications (e.g., word processing, mapping, and media player applications). In one embodiment, operating system 1112 or an application program 1114 includes data protection management component 136, first file system 124 and second file system 126 as described above in reference to FIG. 1.

The illustrated mobile device 1102 can include memory 1120. Memory 1120 can include non-removable memory 1122 and/or removable memory 1124. Non-removable memory 1122 can include RAM, ROM, flash memory, a hard disk, or other well-known memory devices or technologies. Removable memory 1124 can include flash memory or a Subscriber Identity Module (SIM) card, which is well known in GSM communication systems, or other well-known memory devices or technologies, such as "smart cards." Memory 1120 can be used for storing data and/or code for running operating system 1112 and applications 1114. Example data can include Web pages, text, images, sound files, video data, or other data to be sent to and/or received from one or more network servers or other devices via one or more wired or wireless networks. Memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. In an embodiment, memory 1120 includes storage 138, including first memory area 128 and second memory area 130.

Mobile device 1102 can support one or more input devices 1130, such as a touch screen 1132, a microphone 1134, a camera 1136, a physical keyboard 1138 and/or a trackball 1140 and one or more output devices 1150, such as a speaker 1152 and a display 1154. Touch screens, such as touch screen 1132, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens.

Other possible output devices (not shown) can include piezoelectric or other haptic output devices. Some devices can serve more than one input/output function. For example, touch screen 1132 and display 1154 can be combined in a single input/output device. The input devices 1130 can include a Natural User Interface (NUI).

Wireless modem(s) 1160 can be coupled to antenna(s) (not shown) and can support two-way communications between the processor 1110 and external devices, as is well understood in the art. The modem(s) 1160 are shown generically and can include a cellular modem 1166 for communicating with the mobile communication network 1104 and/or other radio-based modems (e.g., Bluetooth 1164 and/or Wi-Fi 1162). At least one of the wireless modem(s) 1160 is typically configured for communication with one or more cellular networks, such as a GSM network for data and voice communications within a single cellular network, between cellular networks, or between the mobile device and a public switched telephone network (PSTN).

Mobile device 1102 can further include at least one input/output port 1180, a power supply 1182, a satellite navigation system receiver 1184, such as a Global Positioning System (GPS) receiver, an accelerometer 1186 (as well as other sensors, including but not limited to a compass and a gyroscope), and/or a physical connector 1190, which can be a USB port, IEEE 1394 (FireWire) port, and/or RS-232 port. The illustrated components of mobile device 1102 are not required or all-inclusive, as any components can be deleted and other components can be added as would be recognized by one skilled in the art.

In an embodiment, certain components of mobile device 1102 are configured to perform the operations attributed to data protection management component 136, first file system 124 and second file system 126 as described in preceding sections. Computer program logic for performing the operations attributed to these components as described above may be stored in memory 1120 and executed by processor 1110. By executing such computer program logic, processor 1110 may be caused to implement any of the features of data protection management component 136, first file system 124 and second file system 126 as described above in reference to FIG. 1. Also, by executing such computer program logic, processor 1110 may be caused to perform any or all of the steps of any or all of the flowcharts depicted in FIGS. 2, 3 and 6-10.

V. Example Computer System Implementation

Figure 12:
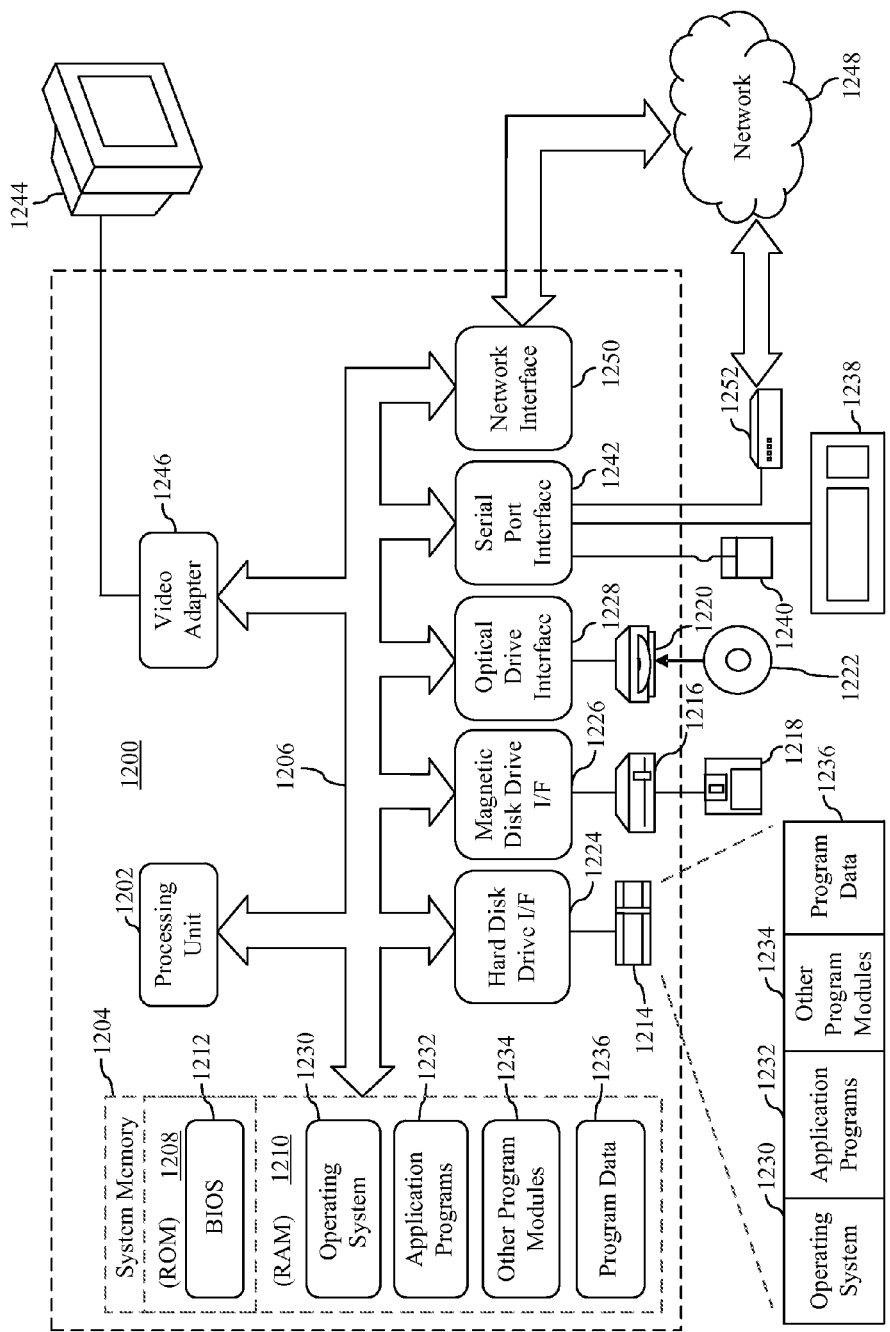
FIG. 12 is a block diagram of an example processor-based computer system that may be used to implement various embodiments described herein.

FIG. 12 depicts an example processor-based computer system 1200 that may be used to implement various embodiments described herein. For example, computer system 1200 may be used to implement end user computing device 102 or server 104 as described above in reference to FIG. 1. Computer system 1200 may also be used to implement any or all of the steps of any or all of the flowcharts depicted in FIGS. 2, 3 and 6-10. The description of computer system 1200 set forth herein is provided for purposes of illustration, and is not intended to be limiting. Embodiments may be implemented in further types of computer systems, as would be known to persons skilled in the relevant art(s).

As shown in FIG. 12, computer system 1200 includes a processing unit 1202, a system memory 1204, and a bus 1206 that couples various system components including system memory 1204 to processing unit 1202. Processing unit 1202 may comprise one or more microprocessors or microprocessor cores. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computer system 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, BLU-RAY™ disk or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1230, one or more application programs 1232, other program modules 1234, and program data 1236. In accordance with various embodiments, the program modules may include computer program logic that is executable by processing unit 1202 to perform any or all of the functions and features of data protection management component 136, first file system 124, and second file system 126 as described above in reference to FIG. 1. The program modules may also include computer program logic that, when executed by processing unit 1202, performs any of the steps or operations shown or described in reference to the flowcharts of FIGS. 2, 3 and 6-10.

A user may enter commands and information into computer system 1200 through input devices such as a keyboard 1238 and a pointing device 1240. Other input devices (not shown) may include a microphone, joystick, game controller, scanner, or the like. In one embodiment, a touch screen is provided in conjunction with a display 1244 to allow a user to provide user input via the application of a touch (as by a finger or stylus for example) to one or more points on the touch screen. These and other input devices are often connected to processing unit 1202 through a serial port interface 1242 that is coupled to bus 1206, but may be connected by other interfaces, such as a parallel port, game port, or a universal serial bus (USB). Such interfaces may be wired or wireless interfaces.

A display 1244 is also connected to bus 1206 via an interface, such as a video adapter 1246. In addition to display 1244, computer system 1200 may include other peripheral output devices (not shown) such as speakers and printers.

Computer system 1200 is connected to a network 1248 (e.g., a local area network or wide area network such as the Internet) through a network interface or adapter 1250, a modem 1252, or other suitable means for establishing communications over the network. Modem 1252, which may be internal or external, is connected to bus 1206 via serial port interface 1242.

As used herein, the terms "computer program medium," "computer-readable medium," and "computer-readable storage medium" are used to generally refer to memory devices or storage structures such as the hard disk associated with hard disk drive 1214, removable magnetic disk 1218, removable optical disk 1222, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1232 and other program modules 1234) may be stored on the hard disk, magnetic disk, optical disk, ROM, or RAM. Such computer programs may also be received via network interface 1250, serial port interface 1242, or any other interface type. Such computer programs, when executed or loaded by an application, enable computer system 1200 to implement features of embodiments of the present invention discussed herein. Accordingly, such computer programs represent controllers of computer system 1200.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, computer system 1200 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

VI. Additional Exemplary Embodiments

An embodiment comprises a method for utilizing a first file system and a second file system executing on a computing device to protect sensitive data stored on the computing device. The first file system manages a first memory area that stores non-sensitive data and is configured to receive data requests generated by programs executing on the computing device. The second file system manages a second memory area that stores sensitive data. The method includes, in a first operating mode, servicing each data request received by the first file system by performing the following steps by the first file system: when the data request specifies non-sensitive data, retrieving the non-sensitive data specified by the data request from the first memory area, and when the data request specifies sensitive data, communicating with the second file system to cause the second file system to retrieve the sensitive data specified by the data request from the second memory area. The method further includes, in a second operating mode, disabling communication between the first file system and the second file system and servicing by the first file system only those data requests received by the first file system that specify non-sensitive data by retrieving the non-sensitive data specified by the data requests from the first memory area.

In one embodiment, the foregoing method also includes, in the second operating mode, deleting the sensitive data stored in the second memory area. Deleting the sensitive data stored in the second memory area may include deleting one or more file pointers utilized by the second file system to manage interaction with one or more sensitive files stored in the second memory area, overwriting sectors of a hard disk drive on which the sensitive data is stored, or utilizing a secure deletion utility to erase the sensitive data from a solid state drive.

In an embodiment in which deleting the sensitive data stored in the second memory area includes deleting one or more file pointers utilized by the second file system to manage interaction with one or more sensitive files stored in the second memory area, the method may further include creating a secure backup copy of the one or more file pointers prior to deleting the one or more file pointers and, in response to an initiation of a recovery operation, restoring the one or more file pointers from the secure backup copy.

In another embodiment of the foregoing method, communicating with the second file system to cause the second file system to retrieve sensitive data specified by the data request from the second memory area and return the secure data specified by the data request to the first file system comprises communicating with the second file system to cause the second file system to retrieve encrypted data from the second memory area, decrypt the encrypted data to produce decrypted data, and return the decrypted data to the first file system.

In yet another embodiment, the foregoing method further includes, in response to determining that a user has changed a data type associated with first data from non-sensitive to sensitive, moving the first data from the first memory area to the second area, and in response to determining that a user has changed a data type associated with second data from sensitive to non-sensitive, moving the second data from the second memory area to the first memory area.

In still another embodiment, the foregoing method further includes intermittently performing a defragmentation operation on the sensitive data stored in the second memory area.

In a further embodiment, the foregoing method further includes switching from the first operating mode to the second operating mode in response to detecting a context-based trigger.

A system in accordance with an embodiment includes at least one processor and one or more memory devices connected to the at least one processor. The one or more memory devices store software components for execution by the at least one processor. The software components include a first file system and a second file system. The first file system is configured to manage a first memory area that stores non-sensitive data and to receive data requests generated by programs during execution thereof. The second file system is configured to manage a second memory area that stores sensitive data. The first file system is further configured to service each data request received thereby by retrieving any non-sensitive data specified by the data request from the first memory area and by sending a request to the second file system to retrieve any sensitive data specified by the data request from the second memory area. The second file system is further configured to: (i) in a first operating mode, respond to requests from the first file system to retrieve sensitive data specified by data requests from the second memory area, and (ii) in a second operating mode, ignore requests from the first file system to retrieve sensitive data specified by data requests from the second memory area.

In one embodiment of the foregoing system, the second file system is further configured to delete the sensitive data stored in the second memory area during the second operating mode. In accordance with such an embodiment, the second file system may be configured to delete the sensitive data stored in the second memory area by deleting one or more file pointers utilized by the second file system to manage interaction with one or more sensitive files stored in the second memory area, by overwriting sectors of a hard disk drive on which the sensitive data is stored, or by utilizing a secure deletion utility to erase the sensitive data from a solid state drive.

In an embodiment in which the second file system is configured to delete the sensitive data stored in the second memory area by deleting one or more file pointers utilized by the second file system to manage interaction with one or more sensitive files stored in the second memory area, the second file system may be further configured to create a secure backup copy of the one or more file pointers prior to deleting the one or more file pointers and to restore the one or more file pointers from the secure backup copy in response to an initiation of a recovery operation.

In another embodiment of the foregoing system, the second file system is configured to encrypt sensitive data to be stored to the second memory area and to decrypt sensitive data retrieved from the second memory area.

In yet another embodiment of the foregoing system, the software components further comprise a data protection management component that is configured to determine that a user has changed a data type associated with first data from non-sensitive to sensitive, and in response to the determination that the user has changed the data type associated with the first data from non-sensitive to sensitive, to interact with at least one of the first file system and the second file system to cause the first data to be moved from the first memory area to the second memory area. The data protection management component may be further configured to determine that a user has changed a data type associated with second data from sensitive to non-sensitive, and in response to the determination that the user has changed the data type associated with the second data from sensitive to non-sensitive, to interact with at least one of the first file system and the second file system to cause the second data to be moved from the second memory area to the first memory area.

In still another embodiment of the foregoing system, the second file system is further configured to intermittently perform a defragmentation operation on the sensitive data stored in the second memory area.

In a further embodiment of the foregoing system, the software components further include a data protection management component that is configured to switch from the first operating mode to the second operating mode in response to detecting a context-based trigger.

A computer program product in accordance with an embodiment comprises a computer-readable memory having computer program logic recorded thereon that when executed by at least one processor causes the at least one processor to perform a method for utilizing a first file system and a second file system executing on a computing device to protect sensitive data stored on the computing device. The first file system manages a first memory area that stores non-sensitive data and is configured to receive data requests generated by programs executing on the computing device. The second file system manages a second memory area that stores sensitive data. The method comprises, in a first operating mode, servicing each data request received by the first file system by performing the following steps by the first file system: when the data request specifies non-sensitive data, retrieving the non-sensitive data specified by the data request from the first memory area, and when the data request specifies sensitive data, communicating with the second file system to cause the second file system to retrieve the sensitive data specified by the data request from the second memory area. The method further includes, in a second operating mode, disabling communication between the first file system and the second file system and servicing by the first file system only those data requests received by the first file system that specify non-sensitive data by retrieving the non-sensitive data specified by the data requests from the first memory area.

In one embodiment of the foregoing computer program product, the method further comprises, in the second operating mode, deleting the sensitive data stored in the second memory area.

VII. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for utilizing a first file system and a second file system executing on a computing device to protect sensitive data stored on the computing device, the first file system managing a first memory area that stores non-sensitive data and the second file system managing a second memory area that stores sensitive data, the first file system being configured to receive data requests generated by programs executing on the computing device, the method comprising:
   in a first operating mode of the computing device, the first operating mode being a mode in which data protection has not been activated, servicing each data request received by the first file system by performing the following steps by the first file system:
      when the data request specifies non-sensitive data, retrieving the non-sensitive data specified by the data request from the first memory area; and
      when the data request specifies sensitive data, communicating with the second file system to cause the second file system to retrieve the sensitive data specified by the data request from the second memory area; and
   in a second operating mode of the computing device, the second operating mode being a mode in which data protection has been activated, disabling communication between the first file system and the second file system such that data requests that specify sensitive data are not serviced, and servicing by the first file system only those data requests received by the first file system that specify non-sensitive data by retrieving the non-sensitive data specified by the data requests from the first memory area.

2. The method of claim 1, further comprising:
   in the second operating mode, deleting the sensitive data stored in the second memory area.

3. The method of claim 2, wherein deleting the sensitive data stored in the second memory area comprises:
   deleting one or more file pointers utilized by the second file system to manage interaction with one or more sensitive files stored in the second memory area.

4. The method of claim 3, further comprising:
creating a secure backup copy of the one or more file pointers prior to deleting the one or more file pointers; and
in response to an initiation of a recovery operation, restoring the one or more file pointers from the secure backup copy.

5. The method of claim 2, wherein deleting the sensitive data stored in the second memory area comprises one of:
overwriting sectors of a hard disk drive on which the sensitive data is stored; or
utilizing a secure deletion utility to erase the sensitive data from a solid state drive.

6. The method of claim 1, wherein communicating with the second file system to cause the second file system to retrieve sensitive data specified by the data request from the second memory area and return the secure data specified by the data request to the first file system comprises:
communicating with the second file system to cause the second file system to retrieve encrypted data from the second memory area, decrypt the encrypted data to produce decrypted data, and return the decrypted data to the first file system.

7. The method of claim 1, further comprising:
in response to determining that a user has changed a data type associated with first data from non-sensitive to sensitive, moving the first data from the first memory area to the second area; and
in response to determining that a user has changed a data type associated with second data from sensitive to non-sensitive, moving the second data from the second memory area to the first memory area.

8. The method of claim 1, further comprising:
intermittently performing a defragmentation operation on the sensitive data stored in the second memory area.

9. The method of claim 1, further comprising:
switching from the first operating mode to the second operating mode in response to detecting a context-based trigger.

10. A system, comprising:
at least one processor; and
one or more memory devices connected to the at least one processor, the one or more memory devices storing software components for execution by the at least one processor, the software components including:
a first file system configured to manage a first memory area that stores non-sensitive data and to receive data requests generated by programs during execution thereof; and
a second file system configured to manage a second memory area that stores sensitive data;
the first file system being further configured to service each data request received thereby by retrieving any non-sensitive data specified by the data request from the first memory area and by sending a request to the second file system to retrieve any sensitive data specified by the data request from the second memory area, and
the second file system being further configured to: (i) in a first operating mode of the computing device, the first operating mode being a mode in which data protection has not been activated, respond to requests from the first file system to retrieve sensitive data specified by data requests from the second memory area, and (ii) in a second operating mode of the computing device, the second operating mode being a mode in which data protection has been activated, ignore requests from the first file system to retrieve sensitive data specified by data requests from the second memory area.

11. The system of claim 10, wherein the second file system is further configured to delete the sensitive data stored in the second memory area during the second operating mode.

12. The system of claim 11, wherein the second file system is configured to delete the sensitive data stored in the second memory area by deleting one or more file pointers utilized by the second file system to manage interaction with one or more sensitive files stored in the second memory area.

13. The system of claim 12, wherein the second file system is further configured to create a secure backup copy of the one or more file pointers prior to deleting the one or more file pointers and to restore the one or more file pointers from the secure backup copy in response to an initiation of a recovery operation.

14. The system of claim 11, wherein the second file system is configured to delete the sensitive data stored in the second memory area by overwriting sectors of a hard disk drive on which the sensitive data is stored or by utilizing a secure deletion utility to erase the sensitive data from a solid state drive.

15. The system of claim 10, wherein the second file system is configured to encrypt sensitive data to be stored to the second memory area and to decrypt sensitive data retrieved from the second memory area.

16. The system of claim 10, wherein the software components further comprise a data protection management component that is configured to determine that a user has changed a data type associated with first data from non-sensitive to sensitive, and in response to the determination that the user has changed the data type associated with the first data from non-sensitive to sensitive, to interact with at least one of the first file system and the second file system to cause the first data to be moved from the first memory area to the second memory area; and
the data protection management component being further configured to determine that a user has changed a data type associated with second data from sensitive to non-sensitive, and in response to the determination that the user has changed the data type associated with the second data from sensitive to non-sensitive, to interact with at least one of the first file system and the second file system to cause the second data to be moved from the second memory area to the first memory area.

17. The system of claim 10, wherein the second file system is further configured to intermittently perform a defragmentation operation on the sensitive data stored in the second memory area.

18. The system of claim 10, wherein the software components further include a data protection management component that is configured to switch from the first operating mode to the second operating mode in response to detecting a context-based trigger.

19. A computer program product comprising a computer-readable memory having computer program logic recorded thereon that when executed by at least one processor causes the at least one processor to perform a method for utilizing a first file system and a second file system executing on a computing device to protect sensitive data stored on the computing device, the first file system managing a first memory area that stores non-sensitive data and the second file system managing a second memory area that stores sensitive data, the first file system being configured to receive data requests generated by programs executing on the computing device, the method comprising:
- in a first operating mode of the computing device, the first operating mode being a mode in which data protection has not been activated, servicing each data request received by the first file system by performing the following steps by the first file system:
  - when the data request specifies non-sensitive data, retrieving the non-sensitive data specified by the data request from the first memory area; and
  - when the data request specifies sensitive data, communicating with the second file system to cause the second file system to retrieve the sensitive data specified by the data request from the second memory area;
- in a second operating mode of the computing device, the second operating mode being a mode in which data protection has been activated, disabling communication between the first file system and the second file system such that data requests that specify sensitive data are not serviced, and servicing by the first file system only those data requests received by the first file system that specify non-sensitive data by retrieving the non-sensitive data specified by the data requests from the first memory area.

20. The computer program product comprising the computer-readable memory of claim 19, wherein the method further comprises:
- in the second operating mode, deleting the sensitive data stored in the second memory area.

* * * * *